United States Patent [19]
Takahashi et al.

[11] Patent Number: 5,978,137
[45] Date of Patent: Nov. 2, 1999

[54] IMAGE STABILIZING APPARATUS

[75] Inventors: Kenichi Takahashi; Kouichi Nagata, both of Omiya, Japan

[73] Assignee: Fuji Photo Optical Co., Ltd., Saitama, Japan

[21] Appl. No.: 08/935,863

[22] Filed: Sep. 23, 1997

[30] Foreign Application Priority Data

Oct. 1, 1996 [JP] Japan ................................... 8-280260

[51] Int. Cl.⁶ .................................................. G02B 27/64
[52] U.S. Cl. ......................... 359/557; 359/407; 359/554
[58] Field of Search ................... 359/554–557, 359/811, 809, 819, 827–830, 831–837; 396/32–55; 348/208

[56] References Cited

U.S. PATENT DOCUMENTS

| | | | |
|---|---|---|---|
| 4,996,545 | 2/1991 | Enomoto et al. | 359/554 |
| 5,122,908 | 6/1992 | Sporer | 359/554 |
| 5,202,706 | 4/1993 | Hasegawa | 359/819 |
| 5,285,313 | 2/1994 | Kobayashi et al. | 359/554 |
| 5,539,575 | 7/1996 | Kakizawa et al. | 359/557 |
| 5,737,131 | 4/1998 | Palmer | 359/399 |
| 5,910,859 | 6/1999 | Takahashi et al. | 359/554 |

FOREIGN PATENT DOCUMENTS

| | | |
|---|---|---|
| 3933255 | 2/1991 | Germany . |
| 57-37852 | 8/1982 | Japan . |
| 6-250100 | 9/1994 | Japan . |
| 7-43645 | 2/1995 | Japan . |
| 2019596 | 10/1979 | United Kingdom ................... 359/554 |

OTHER PUBLICATIONS

Oshima et al. "VHS Camcorder with Electronic Image Stabilizer", IEEE Transaction on Consumer Electronics, Nov. No. 4, 1989, New York.
English Abstract of Japanese Reference No. 7–43645.
English Abstract of Japanese Reference No. 6–250,100.
English Abstract of Japanese Reference No. 54–23554.
English Abstract of Japanese Reference No. 61–288664.

*Primary Examiner*—Thong Nguyen
*Attorney, Agent, or Firm*—Snider & Chao, LLP; Ronald R. Snider

[57] ABSTRACT

In an image stabilizing apparatus employing a system in which the rotational position of gimbal suspension is controlled on the basis of an output value from an angular velocity sensor attached thereto, an actuator for pivotally moving an inner gimbal suspension member is incorporated in the gimbal suspension means, thereby making the apparatus to fully exhibit its functions and allowing the case of a binocular to which the apparatus is attached to have a compact configuration. A rotating motor (105) for pivotally moving the inner gimbal suspension member (107) comprises a magnet (156) and a coil (154) which are disposed close and opposite to each other. The magnet (156) is firmly supported by the inner gimbal suspension member (107), while the coil (154) is firmly supported by the outer gimbal suspension member (7).

2 Claims, 8 Drawing Sheets

IMAGE STABILIZING APPARATUS

RELATED APPLICATIONS

This application claims the priority of Japanese Patent Application No. 8-280260 filed on Oct. 1, 1996, which is incorporated herein by reference.

BACKGROUND OF THE INVENTION

1. Field of the Invention

The present invention relates to an image stabilizing apparatus which is disposed within an optical apparatus such as monocular, binocular, or video camera in order to prevent optical images from being blurred upon viewing when the angle of emission of a luminous flux from the viewed object with respect to the optical axis of such an optical apparatus fluctuates upon vibration.

2. Description of the Prior Art

In cases where an optical apparatus, such as monocular or binocular, aimed for optical viewing is operated as being held with a hand, in particular when the optical apparatus is used as being brought into an airplane, vehicle, or the like, vibration or rolling of the airplane, vehicle, or the like is transmitted to the optical apparatus, whereby the angle of emission of the luminous flux from the viewed object with respect to its optical axis is likely to fluctuate. As a result, the viewed optical image often deteriorates. Even when such a vibration transmitted to the optical apparatus has a small amplitude, the angle of fluctuation with respect to the optical axis is magnified since the monocular, binocular, or the like has a narrow visual field and magnifies the object upon viewing. Hence, the viewed image may move fast in the visual field even upon rolling with a relatively low speed of angular fluctuation, and it may deviate from the visual field when the angle of fluctuation is large. Also, upon rolling with a relatively high speed of angular fluctuation, even when the angle of fluctuation is relatively small, the viewed object has a higher speed of angular fluctuation in response to the magnification of the optical apparatus, whereby the image may blur and deteriorate.

There have conventionally been proposed various kinds of image stabilizing apparatus for preventing a viewed image from deteriorating due to fluctuation in the angle of emission of a luminous flux with respect to the optical axis upon vibration or rolling transmitted to the optical apparatus.

For example, Japanese Patent Publication No. 57-37852 discloses a binocular comprising a vibration isolator therein utilizing a rotational inertial body (gyro motor) in order to correct blur of the viewed image in the binocular.

Namely, in this prior art, an erecting prism is disposed on the optical axis between objective and ocular lenses of the binocular so as to be secured onto gimbal suspension means to which the rotational inertial body is attached, whereby the erecting prism is substantially held in the same posture even when the binocular is vibrated upon a manual shake or the like, so as to prevent the viewed image of the binocular from blurring.

In such a kind of prior art utilizing the rotational inertial body and the gimbal suspension means, while the image can be stabilized with a high precision, a high-speed rotator is necessary for obtaining a large inertial force in a small space. Also, the rotator should have a high precision since it is necessary for the rotator to minimize its own vibration. Due to these requirements for small size, high speed, and high precision, the apparatus may become disadvantageous in terms of cost, life, and time necessary for obtaining a required inertial force after the power is turned on. Also, when the effective diameter of the objective lens is increased in order to attain a higher magnification or resolution in the binocular, the erecting prism has a larger size, thereby necessitating a larger inertial force. Consequently, the disadvantages noted above may become greater. Also, a larger amount of electric power may be consumed accordingly.

Therefore, there has been proposed a commonly-assigned image stabilizing apparatus (Japanese Unexamined Patent Publication No. 6-250100) in which the gimbal suspension means is equipped with an angular velocity sensor in place of the above-mentioned rotational inertial body, while the rotational position of the gimbal suspension means is controlled on the basis of the output value from the angular velocity sensor so as to secure the posture of the erecting prism with respect to the earth (inertial system). In this apparatus, the erecting prism held by the gimbal suspension means basically has an inertial force and, for high-speed vibrations with a high frequency in particular, exhibits a high performance for holding a posture against a vibration with a relatively large amplitude. Accordingly, a small force is sufficient for controlling the rotational position based on the output from the angular velocity sensor.

Variangle prisms and other kinds of image stabilizing apparatus which drive lenses, however, necessitate an active driving section. Since it is necessary for the driving section to be moved with a high speed in order to correct a large amplitude in high-frequency vibrations, such an amplitude is hard to correct over a large angle range.

Also, even where used is an image stabilizing apparatus of a type in which the rotational position of the gimbal suspension means is controlled on the basis of the output value from the angular velocity sensor attached to the gimbal suspension means (hereinafter referred to as "angular velocity sensor equipped type image stabilizing apparatus"), since the gimbal suspension means is accommodated in the case of the optical apparatus, there are problems as follows.

Namely, in order to attach the gimbal suspension means to the case so as to be pivotally movable about two rotational axes respectively extend in transverse and vertical directions, an inner gimbal suspension member and an outer gimbal suspension member are necessary, and two actuators for pivotally moving them are further required. Each of these actuators can be constituted by a magnet and a coil which are disposed opposite and close to each other. Here, the actuator for pivotally moving the outer gimbal suspension member can be inserted between the outer gimbal member and the case without any problem. When the actuator for pivotally moving the inner gimbal suspension member, on the other hand, is inserted between the inner gimbal suspension member and the case, one of the magnet and coil is firmly supported by the inner gimbal suspension member, while the other is firmly supported by the case. Since the inner gimbal suspension member pivotally moves together with the outer gimbal suspension member when the latter pivotally moves, the positional relationship between the magnet and the coil may fluctuate, thus failing to yield a correct gain. Consequently, the pivotal movement of the inner gimbal suspension member may not be controlled appropriately.

Also, though it is desirable for the case to be configured as compact as possible in order to make it easy to carry, it is difficult for the case to have a compact configuration when the actuator for pivotally moving the inner gimbal suspension member such as that mentioned above is used, since it is necessary for the inner face of the case to be provided with a structure for firmly supporting the magnet or coil.

SUMMARY OF THE INVENTION

In view of the foregoing, it is an object of the present invention to provide, when an angular velocity sensor equipped type image stabilizing apparatus is employed, an image stabilizing apparatus which can sufficiently exhibit its functions, while allowing the case of the optical apparatus to which the apparatus is attached to have a compact configuration.

The image stabilizing apparatus in accordance with the present invention is attached to an optical apparatus comprising a monocular or binocular optical system including an erecting prism disposed between objective and ocular lenses which are firmly disposed within a case.

The image stabilizing apparatus comprises:

gimbal suspension means having first and second rotational axes respectively extending in transverse and vertical directions of the optical apparatus so as to pivotally attach the erecting prism to the case;

an actuator system for pivotally moving the gimbal suspension means about the first and second rotational axes;

first and second angular position data detecting means for respectively detecting angular position data of the gimbal suspension means about the first and second rotational axes;

first and second angular velocity data detecting means, firmly attached to the gimbal suspension means, for respectively detecting angular velocity data of the gimbal suspension means upon a change in posture of the optical apparatus; and feedback control means for controlling pivotal movement of the gimbal suspension means about the first and second rotational axes by driving the actuator, based on the data detected by the angular position data detecting means and angular velocity data detecting means, so as to secure the erecting prism with respect to an inertial system;

wherein the gimbal suspension means comprises an inner gimbal suspension member firmly supporting the erecting prism, an outer gimbal suspension member for surrounding the inner gimbal suspension member, a first bearing for causing the inner gimbal suspension member to be pivotally supported by the outer gimbal suspension member, and a second bearing for causing the outer gimbal suspension member to be pivotally supported by the case;

wherein the actuator comprises an actuator for pivotally moving the inner gimbal suspension member and an actuator for pivotally moving the outer gimbal suspension member; and wherein the actuator for pivotally moving the inner gimbal suspension member comprises a magnet and a coil which are disposed close and opposite to each other, one of the magnet and coil being firmly supported by the inner gimbal suspension member, the other being firmly supported by the outer gimbal suspension member.

While the rotational axes of the first and second bearings correspond to two rotational axes respectively extending in transverse and vertical directions of the optical apparatus, any of the former may be any of the latter.

DETAILED DESCRIPTION OF THE PREFERRED EMBODIMENTS

In the following, embodiments of the present invention will be explained with reference to the accompanying drawings.

FIGS. 1, 2, 3, and 4 are respectively a sectional plan view, sectional front view, sectional side view, and perspective view showing a state where an image stabilizing apparatus in accordance with an embodiment of the present invention is built into a binocular. As depicted, a binocular in which an image stabilizing apparatus 20 of this embodiment is built into a case 30 comprises a pair of objective lens systems 1*a* and 1*b*; a pair of ocular lens systems 2*a* and 2*b*; and a pair of erecting prisms 3*a* and 3*b*. The objective lens 1*a*, the ocular lens 2*a*, and the erecting prism 3*a* constitute a first telescopic system 10*a*; whereas the objective lens 1*b*, the ocular lens 2*b*, and the erecting prism 3*b* similarly constitute a second telescopic system 10*b*. A pair of these first and second telescopic systems 10*a* and 10*b* constitute a binocular system.

The pair of objective lens systems 1*a* and 1*b* and pair of ocular lens systems 2*a* and 2*b* constituting this binocular system are firmly attached to the case 30 of this optical apparatus, whereas the erecting prisms 3*a* and 3*b* are pivotally attached to the case 30 by way of gimbal suspension members 7 and 107 respectively having rotational axes 6 and 106 (see FIG. 5) extending in the vertical directions of the apparatus (directions orthogonal to the extending direction of the optical axis and aligning direction of the objective lens systems 1*a* and 1*b*) and in the transverse directions of the apparatus (aligning direction of the objective lens systems 1*a* and 1*b*).

In the following, with reference to FIGS. 5 and 6, basic functions which are prerequisite to the apparatus of this embodiment will be explained. Here, in the specification, the vertical directions of the apparatus refer to the directions of depicted arrows A, whereas the transverse directions of the apparatus refer to the directions of depicted arrows C.

Figure 5:
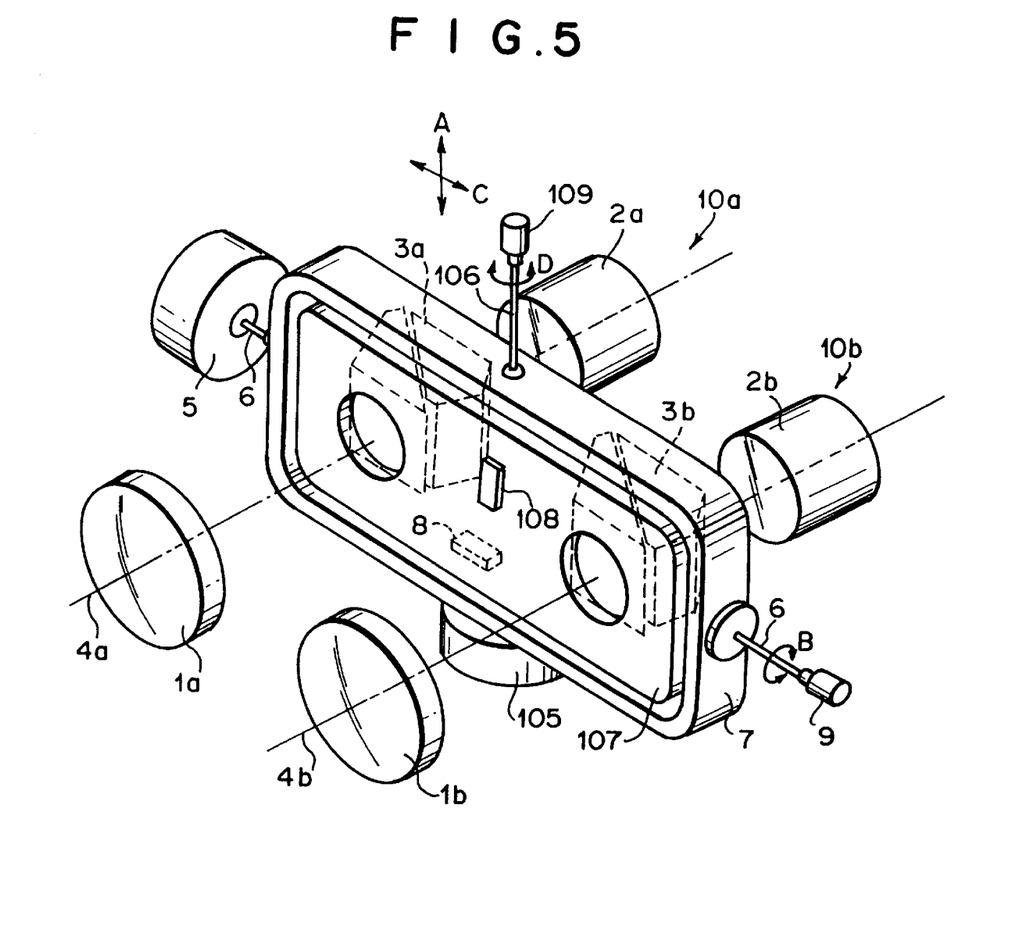
FIG. 5 is a schematic perspective view for explaining basic functions of the above-mentioned image stabilizing apparatus.
Figure 6:
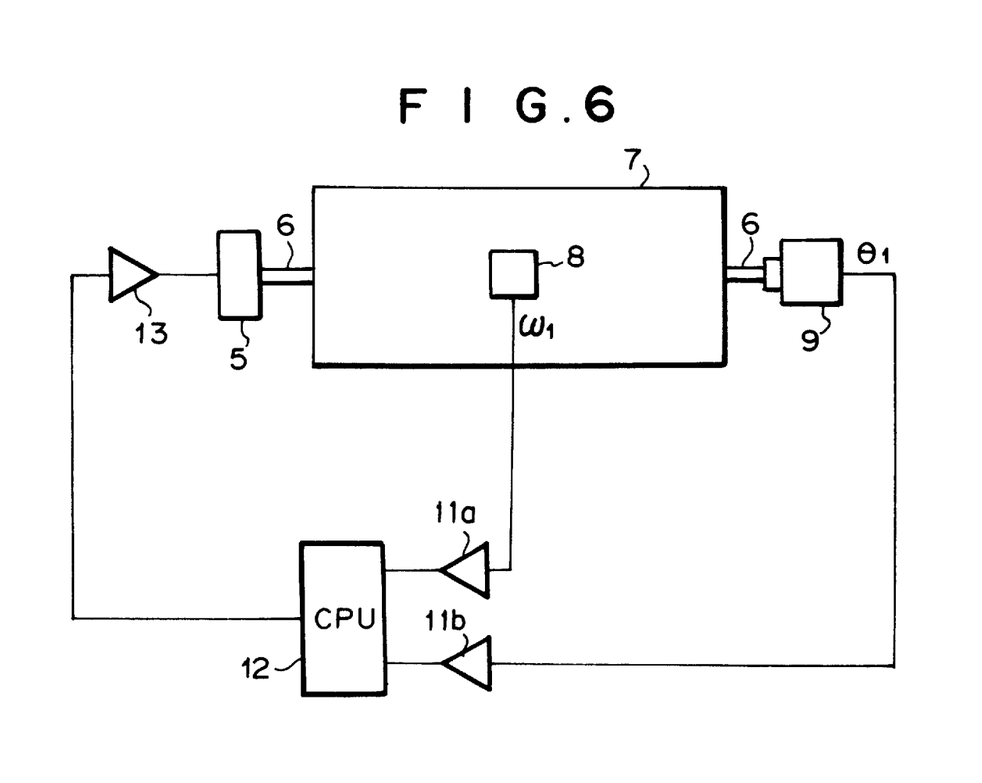
FIG. 6 is a block diagram for explaining basic functions of the above-mentioned image stabilizing apparatus.

In FIG. 5, in a state where the gimbal suspension members 7 and 107 equipped with the erecting prisms 3*a* and 3*b* are secured to the case 30, namely, in a state where the erecting prisms 3*a* and 3*b* attached to the gimbal suspension members 7 and 107 are secured to the case 30, this optical apparatus attains a configuration of an ordinary binocular system. Hereinafter, optical axes 4*a* and 4*b* of the respective telescopic optical systems 10*a* and 10*b* in this state will be referred to as the optical axes of this optical apparatus.

Appropriate positions of the objective lens systems 1*a* and 1*b*, ocular lens systems 2*a* and 2*b*, erecting prisms 3*a* and 3*b*, gimbal suspension members 7 and 107, rotational axes 6 and 106, and the like are described in detail in known publications (e.g., Japanese Patent Publication No. 57-37852) and thus will not be explained here.

As shown in FIG. 5, in the apparatus of this embodiment, the inner gimbal suspension member 107 is axially supported by the outer gimbal suspension member 7, thereby forming a gimbal suspension of a double structure. The outer gimbal suspension member 7 is pivotally moved about the rotational axis 6, which extends in the transverse directions of the apparatus, so as to correct blurs of an image in the vertical directions; whereas the inner gimbal suspension member 107 is pivotally moved about the rotational axis 106, which extends in the vertical directions of the apparatus, so as to correct blurs of the image in the transverse directions. The erecting prisms 3a and 3b are attached to the inner gimbal suspension member 107. Here, for convenience of explanation, the upper and lower sides in FIG. 5 are depicted so as to be opposite to those of FIGS. 1 to 4.

An angular velocity sensor 8 is secured to the center part of the upper wall portion of the outer gimbal suspension member 7, whereas an angular velocity sensor 108 is secured to the center part of the front wall portion of the inner gimbal suspension member 107. The angular velocity sensor 8 is a sensor for detecting a rotational angular velocity $\omega_1$ when the outer gimbal suspension member 7 is pivotally moved in the directions of arrows B due to a vertical shake of the case 30, whereas the angular velocity sensor 108 is a sensor for detecting a rotational angular velocity $\omega_2$ when the inner gimbal suspension member 107 is pivotally moved in the directions of arrows D due to a transverse shake of the case 30.

One end of the rotational axis 6 is provided with a position sensor 9 for detecting a rotational angle $\theta_1$ of the rotational axis 6 in order to effect position feedback control in addition to the velocity feedback control based on the detected angular velocity mentioned above; whereas the other end of the rotational axis 6 is provided with a rotating motor (torque motor) 5 which revolves, based on the values detected by the angular velocity sensor 8 and position sensor 9, the rotational axis 6 of the gimbal suspension member 7 such that the erecting prisms 3a and 3b always resume their initial postures upon vertical shakes of the case 30. On the other hand, one end of the rotational axis 106 is provided with a position sensor 109 for detecting a rotational angle $\theta_2$ of the rotational axis 106 in order to effect the position feedback control in addition to the velocity feedback control based on the detected angular velocity; whereas the other end of the rotational axis 106 is provided with a rotating motor (torque motor) 105 which revolves, based on the values detected by the angular velocity sensor 108 and position sensor 109, the rotational axis 106 of the gimbal suspension member 107 such that the erecting prisms 3a and 3b always resume their initial postures upon transverse shakes of the case 30.

In the following, a basic concept of a control loop in the apparatus of this embodiment will be explained with reference to FIG. 6. As depicted, this apparatus comprises amplifiers 11a and 11b for respectively amplifying the angular velocity signal from the angular velocity sensor 8 and the angle signal from the position sensor 9; a CPU 12 for computing, based on these angular velocity and angle signals, an amount of driving of the rotating motor 5 by which the erecting prisms 3a and 3b resume their initial postures and outputting a control signal based on thus computed amount; and a motor driving circuit 13 for amplifying the control signal from the CPU 12 so as to drive the rotating motor 5. As with the signals detected by the angular velocity sensor 8 and position sensor 9, the signals detected by the angular velocity sensor 108 and position sensor 109 are converted into a control signal by a control loop similar to that shown in FIG. 6, whereby the rotating motor 105 is driven by this control signal.

Though two sets of control loops are thus respectively necessary for causing the two pieces of outer and inner gimbal suspension members 7 and 107 to resume their initial postures in the apparatus of this embodiment, the CPU 12 may be used in common.

Figure 7:
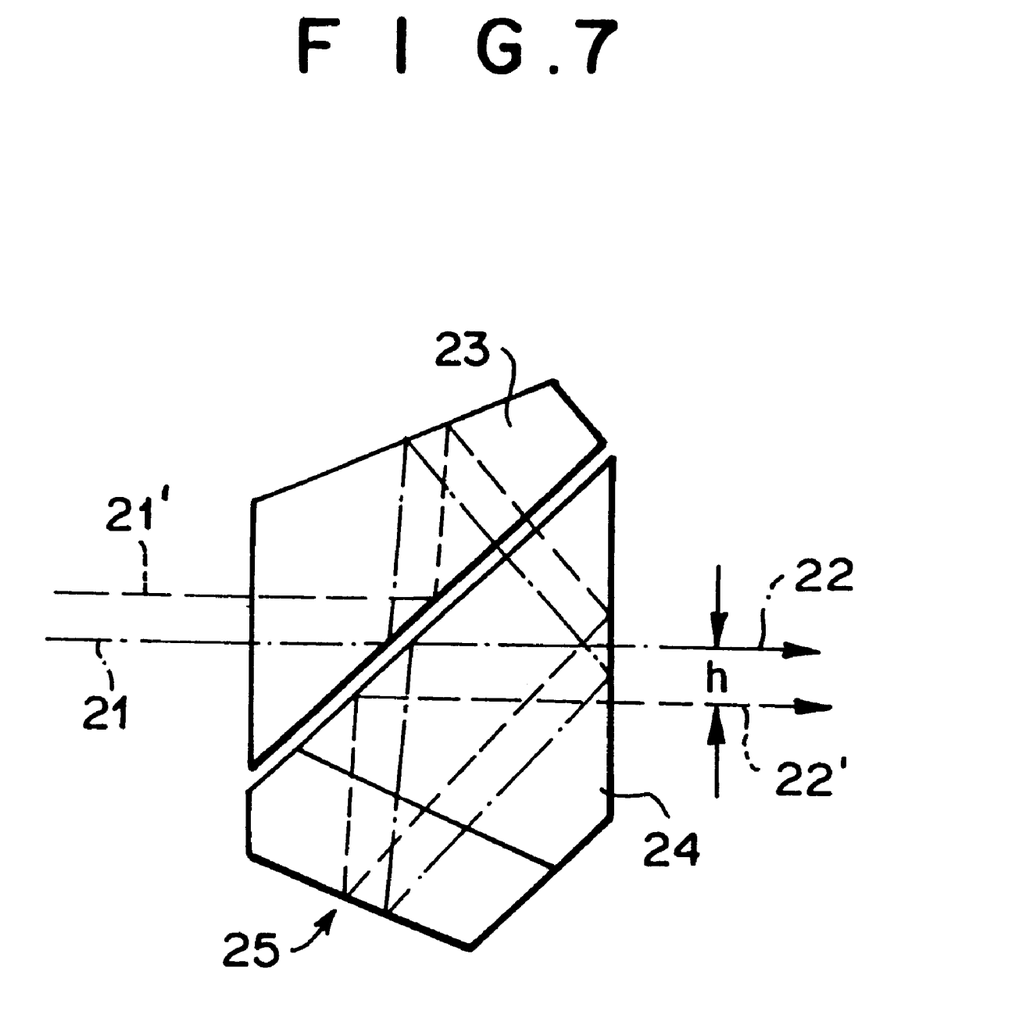
FIG. 7 is a side view for explaining an erecting prism shown in FIG. 1.

Examples of the erecting prisms 3a and 3b include Schmidt erecting prisms, Abbe erecting prisms, Bauern Fend erecting prisms, Porro erecting prisms, and roof erecting prisms. Among these prisms, FIG. 7 shows a Schmidt erecting prism. As depicted, this Schmidt erecting prism is constituted by prisms 23 and 24, while a part 25 of the prism 24 serves as a roof reflecting surface. In such an erecting prism, there is a position of incident light optical axis at which an incident light optical axis 21 and an emanating light optical axis 22 can be placed on the same line as depicted. As shown in FIG. 7, in such an erecting prism in which the incident light optical axis 21 and the emanating light optical axis 22 can be placed on the same line, a light beam 21' which is in parallel to the optical axis 21 and separated upward therefrom by h becomes, after being transmitted through the erecting prism, a light beam 22' which is in parallel to the optical axis 22 and separated downward therefrom by h. Here, not only such a prism in which the incident light optical axis and the emanating light optical axis are placed on the same line but also other prisms can be used as long as they are erecting prisms.

Each of the angular velocity sensors 8 and 108 is a piezoelectric vibration gyro sensor utilizing Coriolis force, which comprises a columnar vibrator having a cylindrical form or the like and a plurality of pieces of piezoelectric ceramic members. Namely, a side face of the columnar vibrator is provided with at least two pieces of detection-purpose piezoelectric ceramic members and at least one piece of feedback-purpose piezoelectric ceramic member.

The respective detection-purpose piezoelectric ceramic members output their detected signals having different values in response to a vibration, and a difference therebetween is computed, thereby yielding an angular velocity.

The feedback-purpose piezoelectric ceramic member is used for correcting the phase of the detected signals.

Since these angular velocity sensors 8 and 108 have a simple configuration and a very small size, the image stabilizing apparatus 20 itself can have a simple configuration and a small size. Also, since they have a high S/N and a high precision, the angular velocity control can be effected with a high accuracy.

Figure 1:
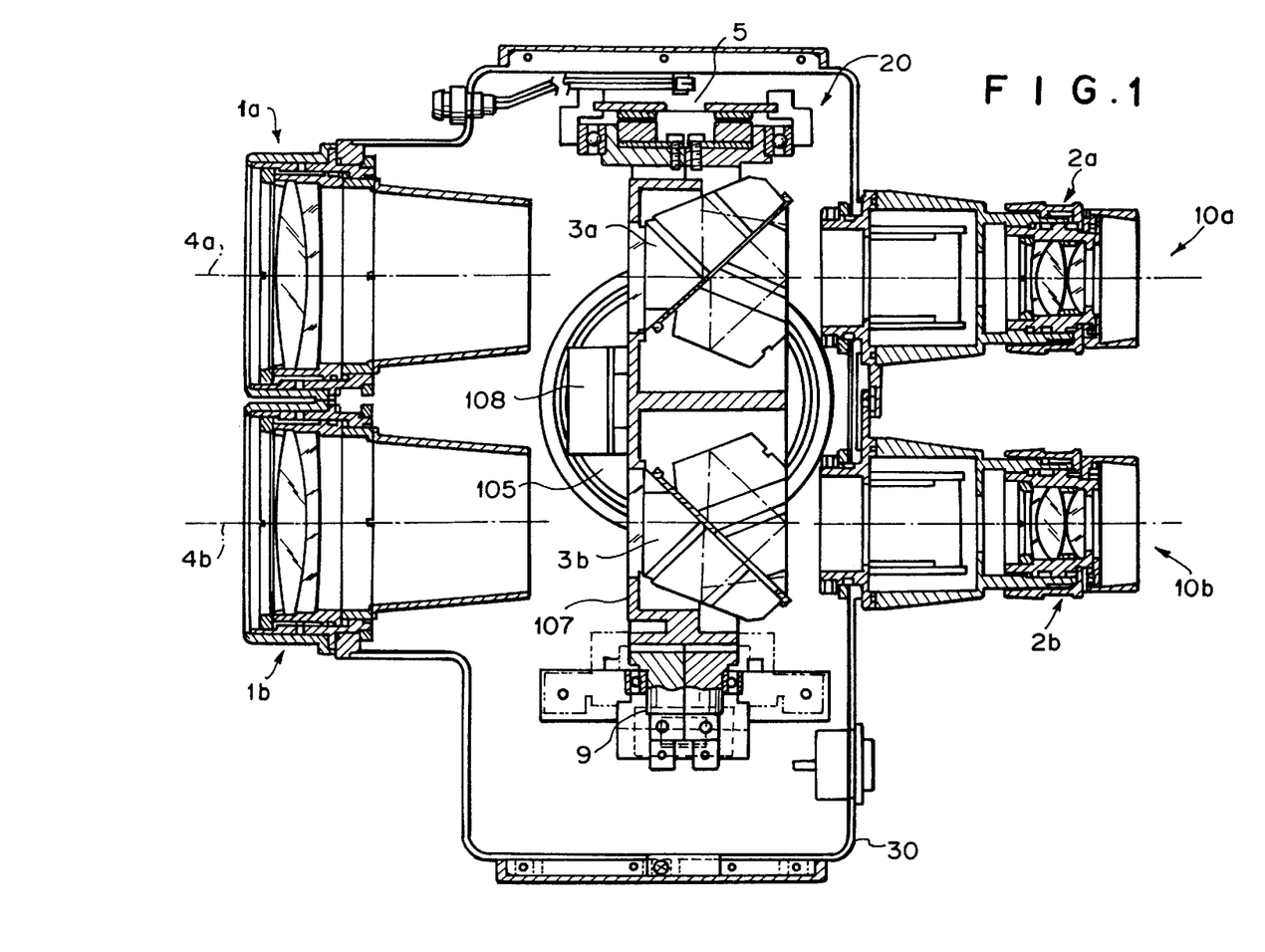
FIG. 1 is a sectional plan view showing a binocular including therein an image stabilizing apparatus in accordance with an embodiment of the present invention.
Figure 2:
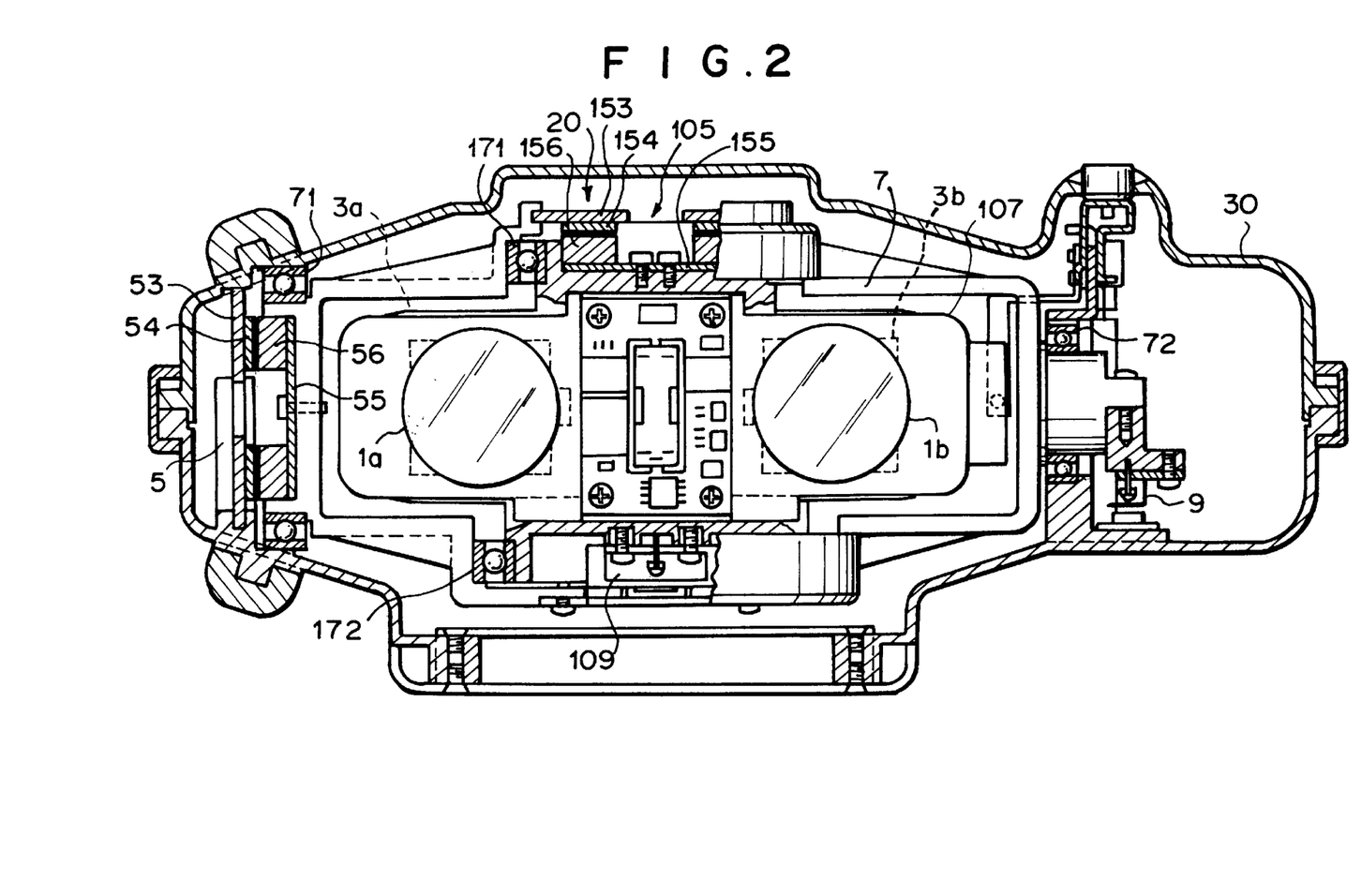
FIG. 2 is a sectional front view showing the above-mentioned binocular.
Figure 3:
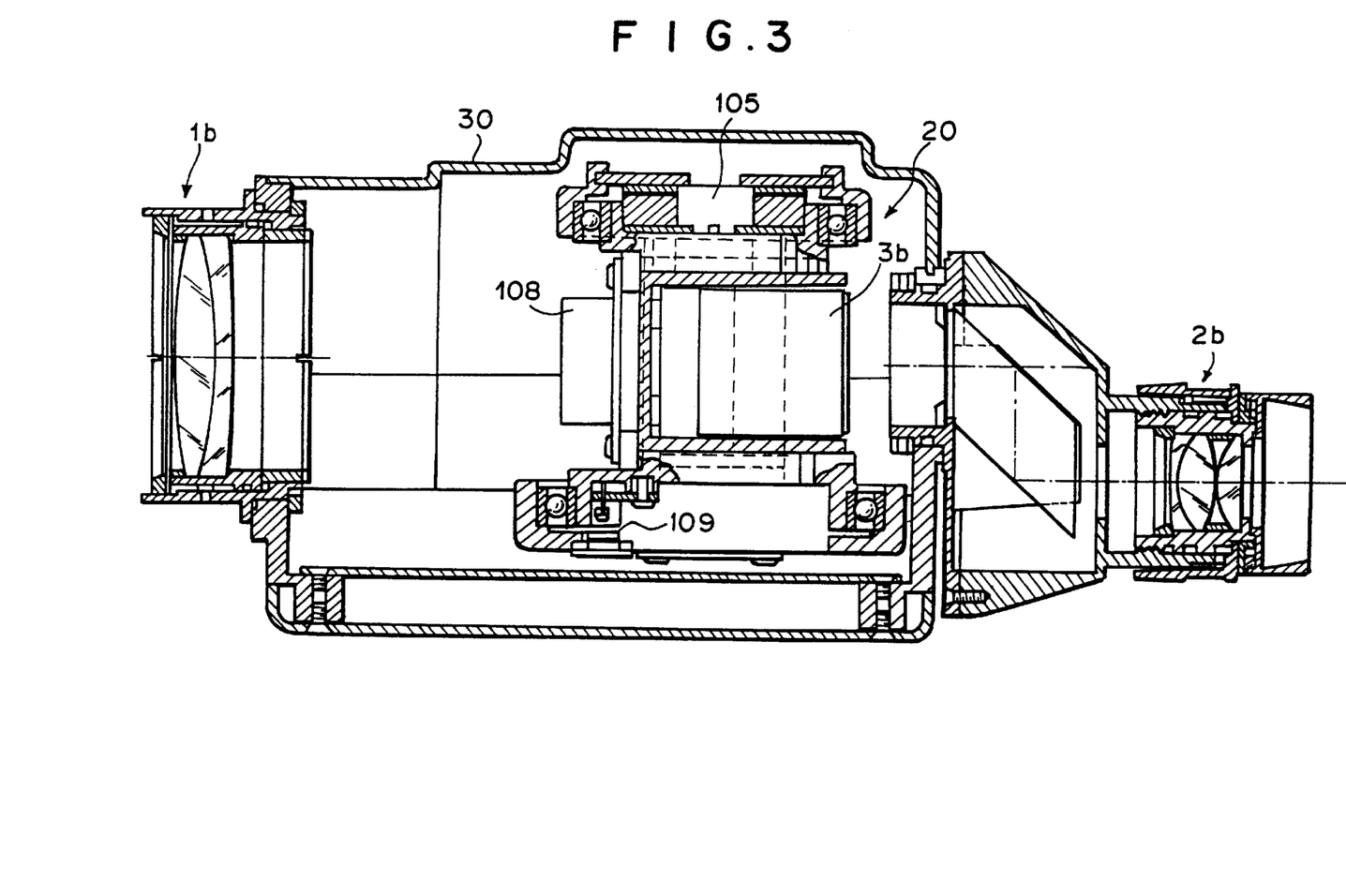
FIG. 3 is a sectional side view showing the above-mentioned binocular.
Figure 4:
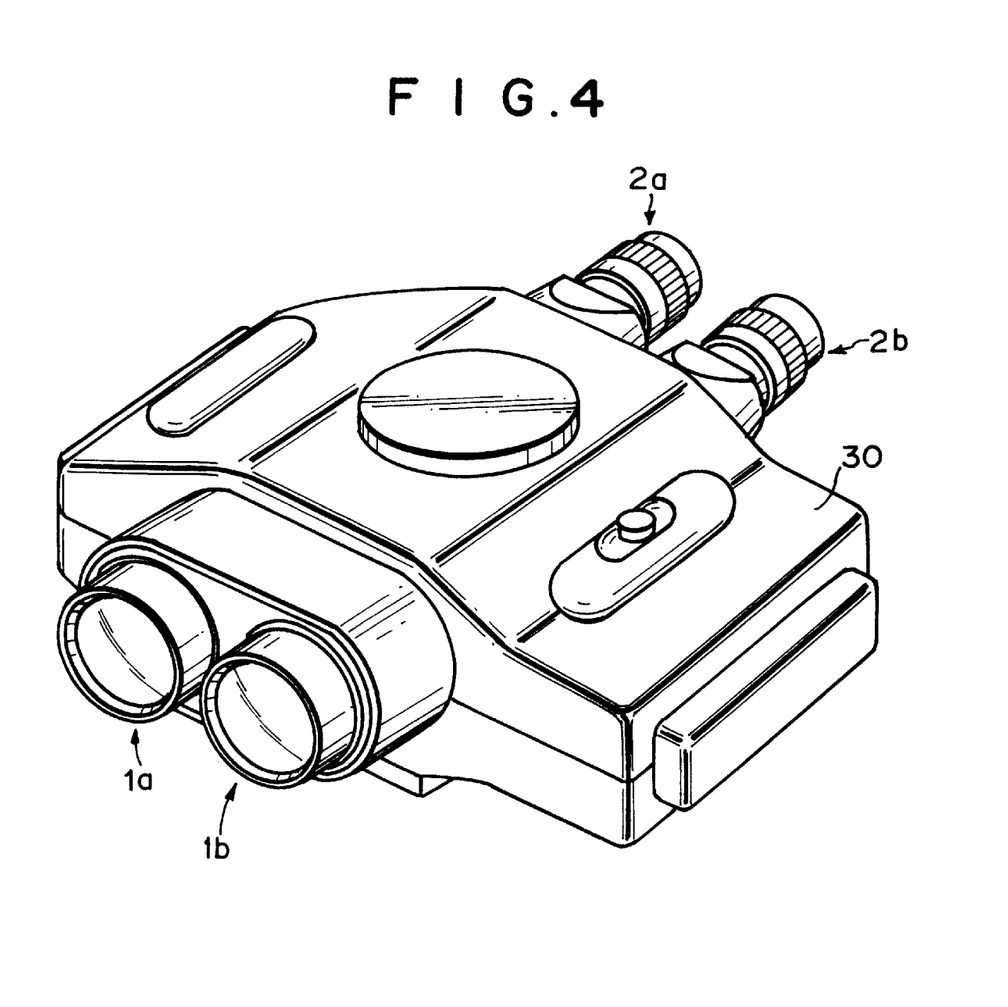
FIG. 4 is a perspective view showing the above-mentioned binocular.

As shown in FIG. 2, the outer gimbal suspension member 7 is pivotally supported by the case 30 at its left and right end portions by way of bearings 71 and 72, whereas the inner gimbal suspension member 107 is pivotally supported by the case 30 at its upper and lower end portions by way of bearings 171 and 172.

The rotating motor (torque motor) 5 for pivotally moving the gimbal suspension member 7 is disposed near the right end portion of the gimbal suspension member 7. The rotating motor 5 comprises a plurality of coils 54 distributed on the circumference of the left side face of a plate 53 secured to the case 30 and an annular magnet 56 attached to the right side face of a plate 55 firmly screwed onto the right end portion of the gimbal suspension member 7 which are disposed close and opposite to each other. The magnet 56 is disposed so as to be positioned in a space on the inner periphery side of the bearing 71. Accordingly, the bearing 71 is formed with a diameter larger than that of the bearing 72 positioned at the left end portion of the gimbal suspension member 7.

On the other hand, the rotating motor (torque motor) 105 for pivotally moving the gimbal suspension member 107 is disposed near the upper end portion of the gimbal suspension member 107. The rotating motor 105 comprises a plurality of coils 154 distributed on the circumference of the lower face of a plate 153 secured to the gimbal suspension member 7 and an annular magnet 156 attached to the upper face of a plate 155 firmly screwed onto the upper end portion of the gimbal suspension member 107 which are disposed close and opposite to each other. The magnet 156 is disposed so as to be positioned in a space on the inner periphery side of the bearing 171. The bearing 172 positioned at the lower end portion of the gimbal suspension member 107 is formed with a diameter larger than that of the bearing 171, whereas the position sensor 109 is attached to the space on the inner periphery side thereof.

In this embodiment, as explained in detail in the foregoing, of the two rotating motors (torque motors) 5 and 105 for respectively rotating the gimbal suspension members 7 and 107 constituting the image stabilizing apparatus 20, the rotating motor 105 for pivotally moving the inner gimbal suspension member 107 comprises the magnet 156 and coils 154 disposed close and opposite to each other, and the magnet is firmly supported by the inner gimbal suspension member 7 while the coils 154 are firmly supported by the outer gimbal suspension member 7. Accordingly, when the outer gimbal suspension member 7 is pivotally moved, the magnet 156 and coils 157 pivotally move together with the gimbal suspension member 7 while maintaining the state in which they are disposed close and opposite to each other. Consequently, there is no risk of the positional relationship between the magnet 156 and coils 154 fluctuating, whereby a correct gain can always be obtained. Accordingly, the pivotal movement of the inner gimbal suspension member 107 can be appropriately controlled.

Figure 8:
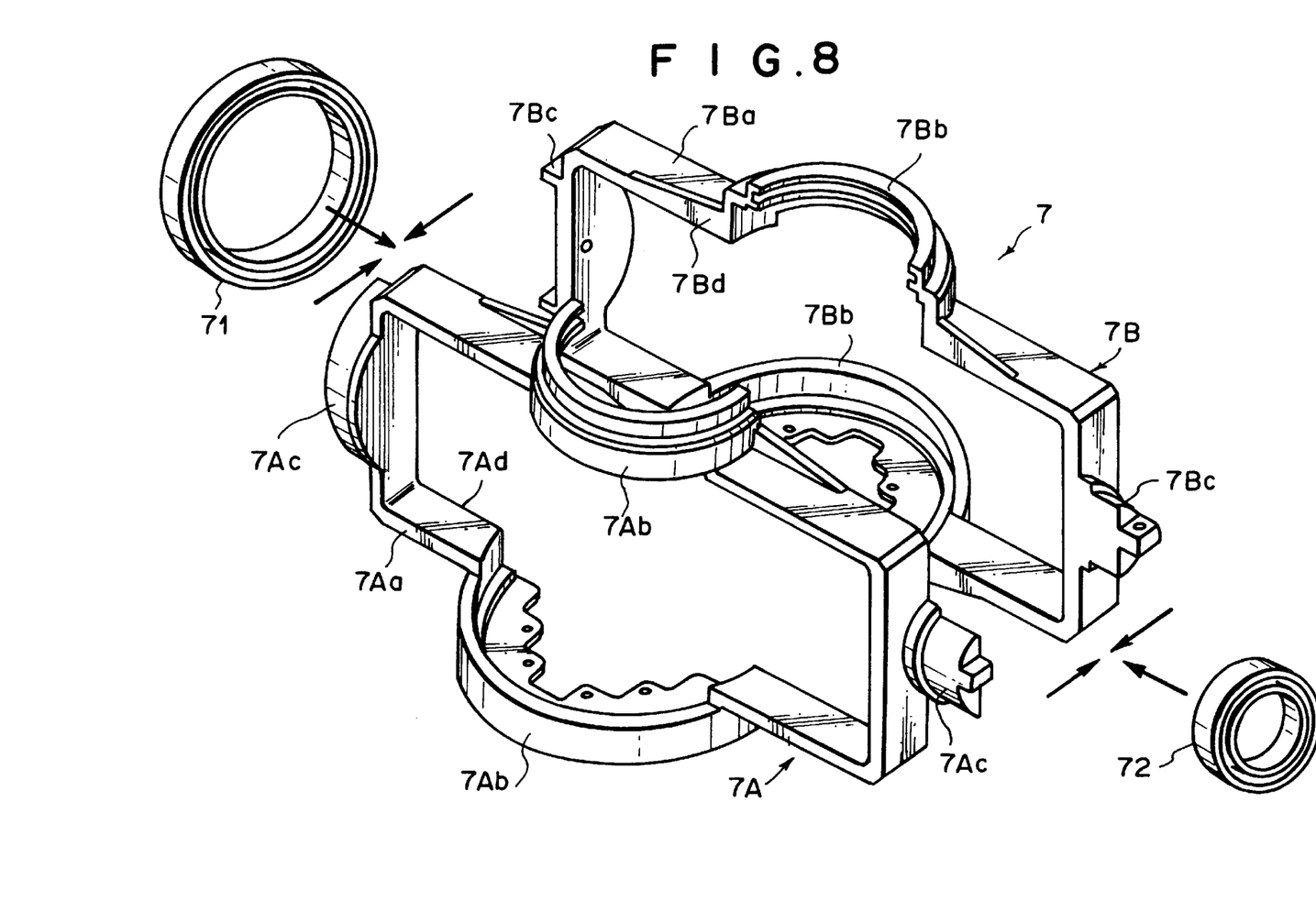
FIG. 8 is a perspective view showing, in detail, an outer gimbal suspension member shown in FIG. 1.

As shown in detail in FIG. 8, the outer gimbal suspension member 7 is constituted as being separable into a pair of gimbal halves 7A and 7B disposed on the front and rear sides thereof. The respective gimbal halves 7A and 7B comprise rectangular frames 7Aa and 7Ba, a pair of upper and lower bearing holders 7Ab and 7Bb formed at the middle portions of the frames 7Aa and 7Ba, and bearing attachments 7Ac and 7Bc formed at the left and right end portions of the frames 7Aa and 7Bb. When the bearings 71 and 72 are fitted onto the bearing attachments 7Ac and 7Bc in the state where parting surfaces 7Ad and 7Bd of the pair of gimbal halves 7A and 7B mate with each other, the gimbal suspension member 7 is assembled. At the time of this assembling process, the bearing holders 7Ab and 7Bb substantially having an arc form hold the bearings 171, 172 and plate 153 fitted to the upper and lower end portions of the inner gimbal suspension member 107 while sandwiching them from the front and rear sides thereof.

In this embodiment, as explained in detail in the foregoing, of the gimbal suspension members 7 and 107, the outer gimbal suspension member 7 comprises a pair of gimbal halves 7A and 7B assembled so as to hold therebetween the bearings 171 and 172 that cause the gimbal suspension member 7 to pivotally support the inner gimbal suspension member 107, and this assembling process is effected by fitting the bearings 71 and 72, which cause the outer gimbal suspension member 7 to be pivotally supported by the case 30, onto the left and right end portions of the pair of gimbal halves 7A and 7B. Accordingly, without using any additional fastening means such as screws, the gimbal suspension member 107 can be attached to the inside of the gimbal suspension member 7, and the gimbal suspension member 7 itself can be assembled. Namely, the gimbal suspension means that can be pivotally movable about the two rotational axes can be assembled by the elements constituting the gimbal suspension means alone.

Thus, in accordance with this embodiment, when an angular velocity sensor equipped type image stabilizing apparatus is employed, its gimbal suspension means can have a simple structure and can be made easy to assemble.

Also, in this embodiment, since it is unnecessary for the inner face of the case 30 to be provided with a structure for firmly supporting the magnet 156 or coils 154, the case 30 can have a compact configuration.

Without being restricted to the above-mentioned embodiment, the image stabilizing apparatus of the present invention can be modified in various manners. For example, as the angular velocity data detecting means, not only the piezoelectric vibration gyro sensors of columnar vibrator type but those using various types of vibrators such as triangular prism vibrator type, quadrangular prism vibrator type, and tuning fork vibrator type can be used. Further, other kinds of various angular velocity sensors can be used.

Here, as the angular position data detecting means, various kinds of angle sensors such as resolver, synchro, and rotary encoder may be used in place of the above-mentioned position sensor.

Though the apparatus of the above-mentioned embodiment is configured so as to be applied to a binocular, the image stabilizing apparatus of the present invention can also be configured so as to be applicable to a monocular. Also, similar effects can be attained when the apparatus is attached to a camera such as video camera.

In the present invention, when the angular velocity sensor equipped image stabilizing apparatus is employed, of the two actuators for respectively pivotally moving its inner and outer gimbal suspension members, the actuator for pivotally moving the inner gimbal suspension member comprises a magnet and a coil which are disposed close and opposite to each other, and one of the magnet and coil is firmly supported by the inner gimbal suspension member, while the other is firmly supported by the outer gimbal suspension member. Accordingly, when the outer gimbal suspension member is pivotally moved, the magnet and the coil pivotally move together with the outer gimbal suspension member while maintaining the state where they are disposed close and opposite to each other. Therefore, there is no risk of the positional relationship between the magnet and coil fluctuating, whereby a correct gain can always be obtained, thus allowing the pivotal movement of the inner gimbal member to be controlled appropriately.

Also, in the present invention, since it is unnecessary for the inner face of the case to be provided with a structure for firmly supporting the magnet or coil of the actuator for pivotally moving the inner gimbal suspension member, the case can have a compact configuration.

Thus, in accordance with the present invention, when the angular velocity sensor equipped type image stabilizing apparatus is employed, functions of the apparatus can sufficiently be exhibited, while the case of the optical apparatus to which the image stabilizing apparatus is attached can have a compact configuration.

What is claimed:

1. An image stabilizing apparatus attached to an optical apparatus, said optical apparatus comprising:

a monocular or binocular optical system including an erecting prism disposed between objective and ocular lenses which are firmly disposed within a case;

said image stabilizing apparatus comprising:

gimbal suspension means having first and second rotational axes respectively extending in transverse and vertical directions of said optical apparatus so as to pivotally attach said erecting prism to said case;

an actuator means for pivotally moving said gimbal suspension means about said first and second rotational axes;

first and second angular position data detecting means for respectively detecting angular position data of said gimbal suspension means about said first and second rotational axes;

first and second angular velocity data detecting means, firmly attached to said gimbal suspension means, for respectively detecting angular velocity data of said gimbal suspension means upon a change in posture of said optical apparatus; and feedback control means for controlling pivotal movement of said gimbal suspension means about said first and second rotational axes by driving said actuator means, based on the data detected by said angular position data detecting means and angular velocity data detecting means, so as to secure said erecting prism with respect to an inertial system;

wherein said gimbal suspension means comprises an inner gimbal suspension member firmly supporting said erecting prism, an outer gimbal suspension member for surrounding said inner gimbal suspension member, a first bearing for causing said inner gimbal suspension member to be pivotally supported by said outer gimbal suspension member, and a second bearing for causing said outer gimbal suspension member to be pivotally supported by said case;

wherein said actuator means comprises an actuator for pivotally moving said inner gimbal suspension member and an actuator for pivotally moving said outer gimbal suspension member; and wherein said actuator for pivotally moving said inner gimbal suspension member comprises a magnet and a coil which are disposed close and opposite to each other, one of said magnet and coil being firmly supported by said inner gimbal suspension member, the other being firmly supported by said outer gimbal suspension member.

2. An image stabilizing apparatus according to claim 1, wherein said outer gimbal suspension member comprises a pair of gimbal halves assembled so as to hold therebetween said first bearing, and said gimbal halves being assembled by fitting said second bearing onto said pair of gimbal halves.

* * * * *